United States Patent
Cocconi

[19]

[11] Patent Number: 6,112,575
[45] Date of Patent: Sep. 5, 2000

[54] METHOD AND APPARATUS FOR VEHICLE EXHAUST GAS POLLUTANT MASS FLOW MEASUREMENT

[75] Inventor: Alan G. Cocconi, Glendora, Calif.

[73] Assignee: AC Propulsion, Inc., San Dimas, Calif.

[21] Appl. No.: 09/058,731

[22] Filed: Apr. 10, 1998

[51] Int. Cl.[7] .................................................. G01M 15/00
[52] U.S. Cl. ........................................ 73/23.31; 73/118.1
[58] Field of Search .............................. 73/23.31, 23.32, 73/117.3, 118.1, 116, 117.2; 701/110, 101, 102, 108, 109, 111

[56] References Cited

U.S. PATENT DOCUMENTS

| | | | |
|---|---|---|---|
| 4,727,746 | 3/1988 | Mikasa et al. | 73/23.31 |
| 5,129,257 | 7/1992 | Carduner et al. | 73/23.31 |
| 5,628,296 | 5/1997 | Herrington et al. | 123/571 |
| 5,709,082 | 1/1998 | Harris et al. | 73/23.31 |
| 5,739,413 | 4/1998 | Kohn et al. | 73/23.31 |
| 5,756,360 | 5/1998 | Harvey et al. | 73/23.31 |

*Primary Examiner*—Eric S. McCall
*Attorney, Agent, or Firm*—D'Alessandro & Ritchie

[57] ABSTRACT

A method and apparatus to provide a very compact and low power measurement of vehicular (automobile) exhaust emissions with results similar to those obtained with traditional CVS dynamometer lab emissions equipment. The sample dilution necessary for the analysis is performed by a computer controlled PWM valve as a function of measure exhaust mass flow, with the result that a "mini CVS" is accurately performed on a small fraction of the total exhaust flow.

33 Claims, 4 Drawing Sheets

METHOD AND APPARATUS FOR VEHICLE EXHAUST GAS POLLUTANT MASS FLOW MEASUREMENT

BACKGROUND OF THE INVENTION

1. Field of the Invention

The present invention relates to internal combustion automobile emissions measurements for which results are to be obtained in the form of mass per distance traveled (or mass per unit of time) for each pollutant of interest rather than as a simple concentration. More particularly the present invention is directed to a method and apparatus that reduces the size and power consumption of the equipment needed for such a measurement to a point where it can be conveniently installed in a moving vehicle for accurate, on-the-road, real-time measurements.

2. The Background

Vehicle gas pollutant mass flow measurements are traditionally made by the Constant Volume Sampling (CVS) method. Traditional CVS equipment dilutes the entire vehicle exhaust flow to a constant volume flow with a variable amount of fresh air, so that the resultant concentration of each pollutant is directly proportional to its mass flow at the tailpipe. The air pumps needed for this method must operate at a flow larger than the greatest expected exhaust flow of the engine under test and, as a result, are too large and need too much power to be conveniently installed in a vehicle such as the vehicle to be tested.

Prior art schemes for reducing the bulk and power consumption of emission mass flow measurement have included the concept of performing the constant volume dilution on a small (fixed) fraction of the total exhaust flow using calibrated orifices, flow restrictors and other fluidic components to perform the needed functions. Such schemes have had the disadvantages of poor accuracy over the broad dynamic range needed for real-time on-the-road passenger vehicle pollution performance evaluation and need hardware changes to rescale the operating exhaust mass flow range for different test conditions or vehicle models.

The U.S. Code of Federal Regulations (CFR) Tide 40, part 86, p. 444, section 86.140-82 entitled "Exhaust Sample Analysis" discusses present requirements for CVS measurements in the United States in connection with measuring automobile exhausts for compliance with environmental regulations. It would be desirable to meet these requirements for CVS measurements in a portable device easily adapted to and carried by any vehicle.

SUMMARY OF THE INVENTION

A method and apparatus are provided for performing a constant volume dilution on a small fraction of the total exhaust flow. This is implemented by four components: a tailpipe mass flow sensor, a control computer, a two input, single output, pulse-width-modulated (PWM) solenoid valve, and a small constant-flow sampling pump. The solenoid PWM valve is controlled by the computer so that the fraction of exhaust in the diluted sample is directly proportional to the tailpipe mass flow. The inherent linearity and fast response time of the PWM-controlled dilution system and the simple programmability of the full scale (no dilution) mass flow setting overcome the limitations of the prior art.

In another aspect of the invention a real time display (slightly delayed due to the finite gas analyzer response time) of exhaust mass flow (which may be easily converted to approximate engine power) and pollutant mass flow rates can be provided in the vehicle. Measured dilute sample concentrations may be simply integrated over time and multiplied by the full scale mass flow setting to yield the total mass of each of the measured emissions. Vehicle speed measurement may be further combined with the emissions' mass measurements to obtain results in the customary grams per mile (or gm/km) format of current vehicle certification tests.

OBJECTS AND ADVANTAGES OF THE INVENTION

Accordingly, it is an object and advantage of the present invention to provide a method and apparatus for measuring vehicle emissions with results similar to CVS certification tests using low power, compact equipment that may be conveniently used for on-the-road tests as is needed to accurately evaluate in-use vehicular emissions.

It is a further object and advantage of the present invention to use the inherent linearity of a PWM controlled solenoid valve to perform the accurate sample dilution necessary for the precise measurement of vehicle emissions.

It is yet a further object and advantage of the present invention to have the full scale mass flow range of the apparatus software controlled for measurement and application flexibility.

These and many other objects and advantages of the present invention will become apparent to those of ordinary skill in the art form a consideration of the drawings and ensuing description of the invention.

DESCRIPTION OF THE PREFERRED EMBODIMENTS

Those of ordinary skill in the art will realize the following description of the present invention is in many details illustrative only and is not intended to be in any way limiting. Other measurements and information processing techniques will readily suggest themselves to such skilled persons from an examination of the within disclosure.

Figure 1:
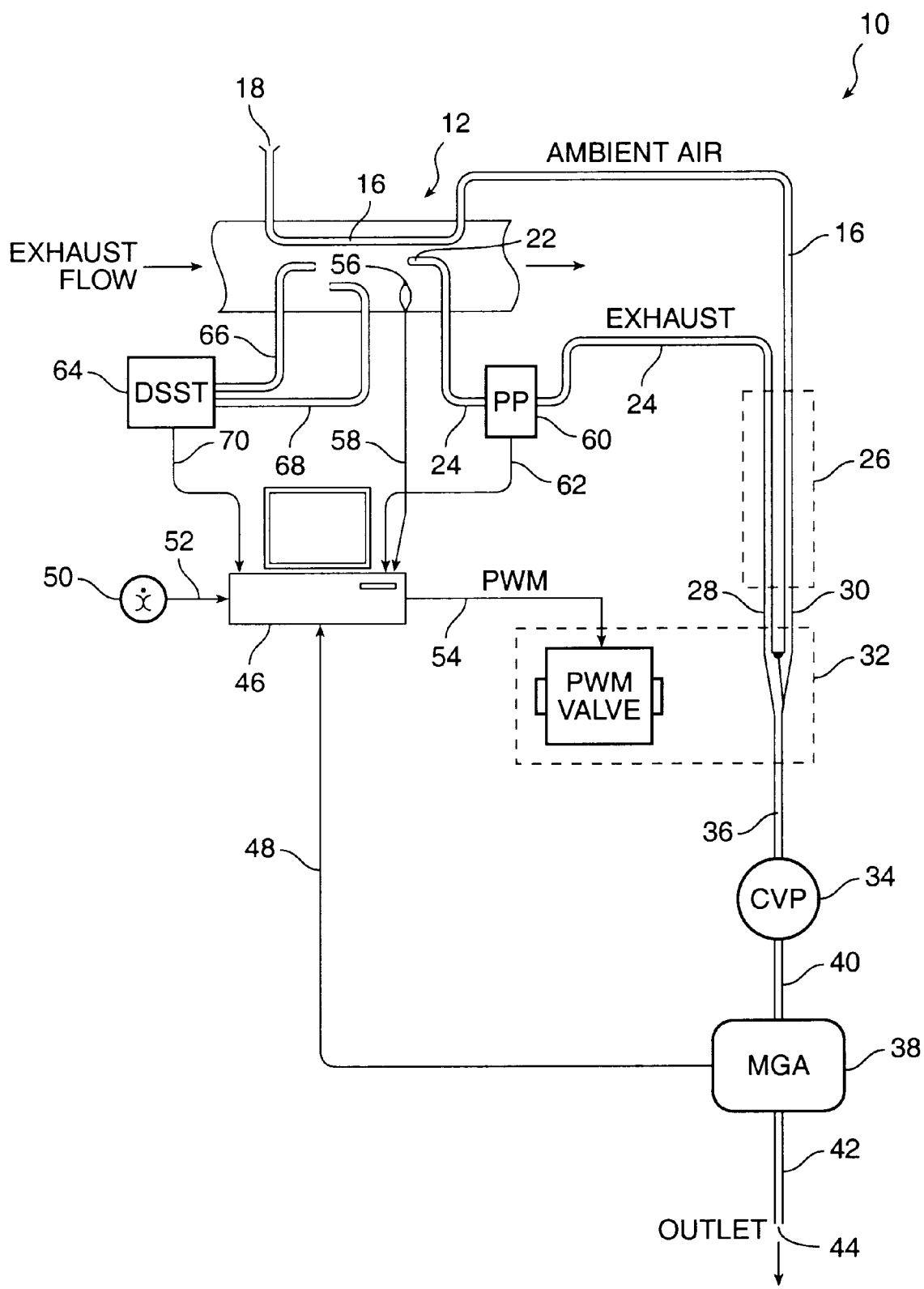
FIG. 1 is a schematic diagram of the apparatus used to perform the emissions mass flow measurement according to a presently preferred embodiment of the present invention.

Turning to FIG. 1, measurement apparatus 10 is shown in schematic diagram form. A tailpipe extension tube 12 is designed to couple to the tailpipe of the exhaust systems of an internal combustion engine, the exhaust of which is to be measured.

Figure 2:
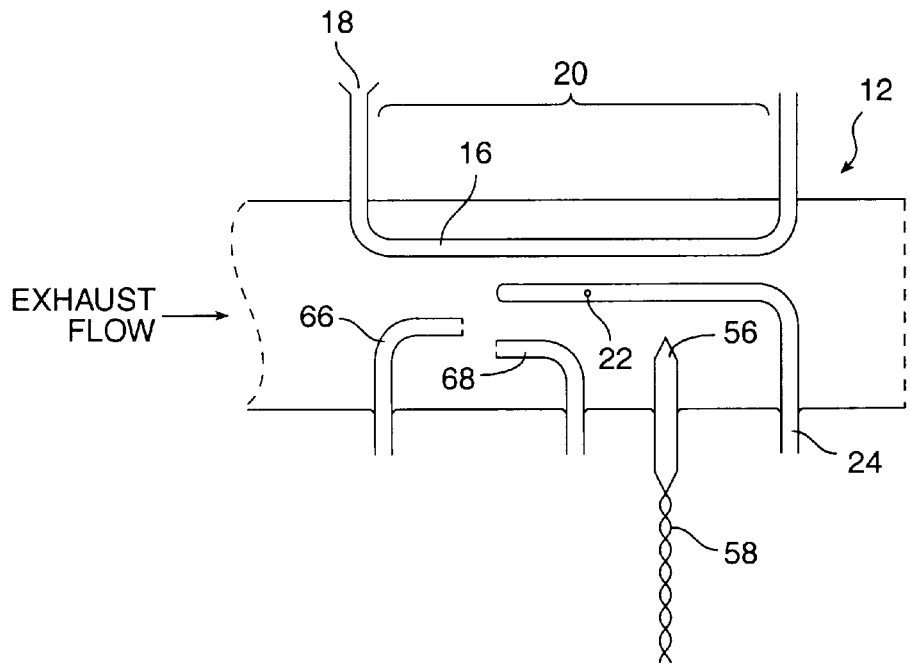
FIG. 2 is a diagram showing a tailpipe extension element according to a presently preferred embodiment of the present invention that performs the exhaust mass flow measurement and sample extraction.

Tailpipe extension tube 12, shown in more detail in FIG. 2, includes an ambient air tube 16. Ambient air enters tube 16 through ambient air input port 18. Ambient air in tube 16 is preferably warmed by exposure of tube 16 to the exhaust stream along a length 20 of the inside of tailpipe extension tube 12 as shown.

Exhaust air flowing from left to right in FIGS. 1 and 2 is channeled from tailpipe extension tube 12 through exhaust port 22 and into exhaust gas tube 24.

Exhaust gas tube 24 and ambient air tube 16 are coupled to heat exchanger 26 which is preferably a conventional fluid heat exchanger device. Heat exchanger 26 causes the temperatures of the gases in tube 24 and tube 16 to equalize. Heat exchanger 26 then passes equal temperature exhaust samples and fresh air over tubes 28, 30, respectively, to PWM dilution valve ("gas control valve") 32 that, in turn, feeds constant volume pump 34 over tube 36. In a presently preferred embodiment of the present invention, the constant volume flow rate at pump 34 is typically about 15 ml/sec (and may be set to any other suitable rate).

The output of pump 34 then feeds multi-gas analyzer (MGA) 38 over tube 40. to Spent gas is exhausted from MGA 38 over tube 42 to exhaust port 44. MGA 38 typically provides outputs of concentrations of hydrocarbons (HC), carbon monoxide (CO), nitric oxide (NOx), carbon dioxide ($CO_2$) and oxygen ($O_2$) to computer or controller 46 over data line 48 for computation and display in a conventional manner. MGA 38 may measure one or more of these gasses. Multi-gas analyzers are available from a number of commercial sources. Presently preferred is the model 6600 available from Andros of Berkeley, Calif. Vehicle speed sensor 50 outputs its measurement to computer 46 over line 52 as shown.

The duty cycle of PWM valve 32 is controlled by computer 46 over line 54 so that the ratio (exhaust gas)/(total volume) delivered to pump 34 is equal to the exhaust mass flow divided by the mass flow range, where the mass flow range is a constant set at the beginning of the emissions test and must be larger than the greatest exhaust mass flow encountered during the test. To achieve the greatest emission sensitivity, it is desirable to minimize the dilution ratio for any given test, and this may be accomplished by setting the mass flow range as low as possible consistent with the requirements of the specific test.

Additional measurements are provided by tailpipe extension tube 12. The temperature, T, of the exhaust gases flowing in tailpipe extension tube is measured by a thermal sensor such as thermocouple 56 and is conveyed to computer over line 58 as data or a voltage signal in a manner well known to those of ordinary skill in the art. Static pressure within tailpipe extension tube 12, $P_S$, is measured with pressure probe sensor system 60 coupled to exhaust tube 24 in a conventional manner and converted to a data or voltage signal on line 62 for use by computer 46. Dynamic pressure within tailpipe extension tube 12, $P_D$, is measured with a differential solid state transducer 64 plumbed between pressure probes 66 and 68 to determine the pressure difference between forward facing probe 66 and rear facing probe 68. A signal from differential solid state transducer 64 is transmitted to computer 46 over line 70.

FIGS. 3, 4, 5 and 6 are flow charts of the basic control and calculation operations and processes performed by computer 46 (FIG. 1) under the control of software.

Figure 3:
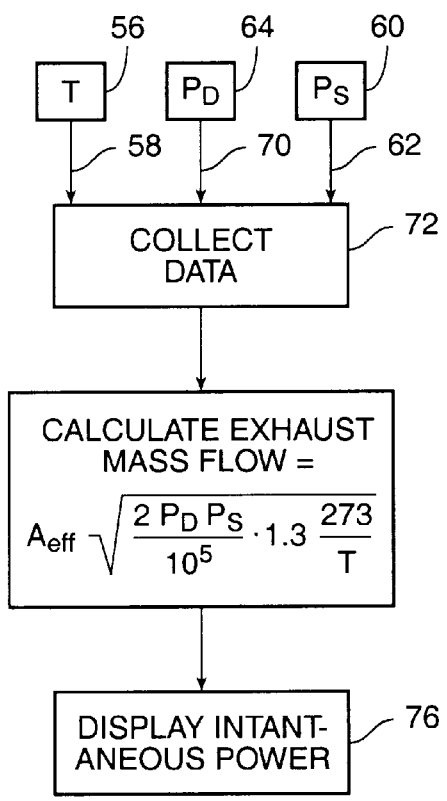
FIGS. 3, 4, 5 and 6 are flow charts showing the control and display computer functions in accordance with a presently preferred embodiment of the present invention.
Figure 4:
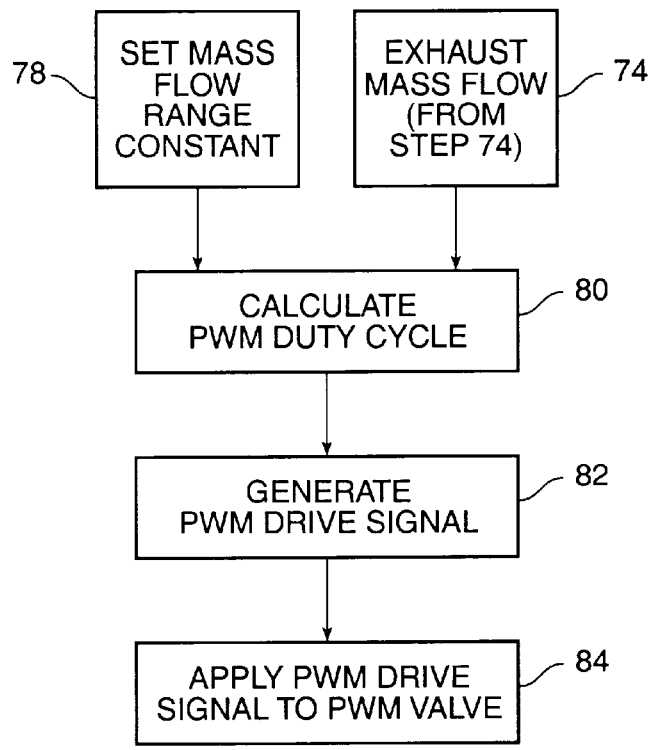

Exhaust mass flow is calculated i FIG. 3 as follows: First, the pertinent data are collected at step 72. These include the temperature, T, in degrees kelvin, which is transmitted to computer 46 over line 58 from sensor 56; the dynamic pressure, $P_D$, in atmospheres, which is transmitted to computer 46 over line 70 from sensor 64; and the static pressure, $P_S$, in atmospheres, which is transmitted to computer 46 over line 62 from sensor 60.

At step 74 the exhaust mass flow in Kg sec$^{-1}$ is calculated by taking $A_{eff}$, the tailpipe effective area in square meters and multiplying it by $$\sqrt{\frac{2 P_D P_S}{10^5} * 1.3 * \frac{273}{T}}.$$

At step 76, the estimated instantaneous power of the internal combustion engine under test may be displayed. This estimate is not required for emission measurement but it may be of interest to the operator. The power estimate is derived in a conventional manner from the measured exhaust gas flow and from assumptions for engine thermal efficiency, air-fuel ratio, and fuel energy content. The accuracy of the power estimate depends on the assumptions, but accuracy within +/−20% can be achieved.

Turning to FIG. 1, PWM valve 32 is controlled by "PWM" signal on line 54 from computer 46. The PWM duty cycle signal "PWM" on line 54 controls the dilution of exhaust gases from tube 28 with ambient air from tube 30 by setting the percentage of the time that valve 32 allows gas from tube 28 to pass to output tube 36 (and, consequently, the remaining percentage of the time that valve 32 allows gas from tube 30 to pass to output tube 36). This duty cycle is determined, as shown in the flow chart of FIG. 4, by using the mass flow range constant set by the operator at step 78, and by using the exhaust mass flow calculated at step 74 of FIG. 3. At step 80, the calculation:

$$\text{Duty cycle} = \frac{\text{Exhaust Sample}}{\text{Exhaust Sample} + \text{Dilution Air}}$$
$$= \frac{\text{Mass Flow (34)}}{\text{Mass Flow Range (78)}}$$

is used to generate the PWM drive signal at step 82 in a conventional manner. In a presently preferred embodiment of the present invention the PWM valve 32 cycles four times per second (4 Hz) but other ratios could be used as those of ordinary skill in the art will now readily recognize. During each cycle, valve 32 allows exhaust sample gas in line 28 to pass for a certain percentage of the cycle and input fresh air in line 30 to pass for the rest of the cycle. The cyclic duty cycle signal controlling valve 32 is the "PWM" signal passed on line 54 to valve 32 in step 84.

Figure 5:
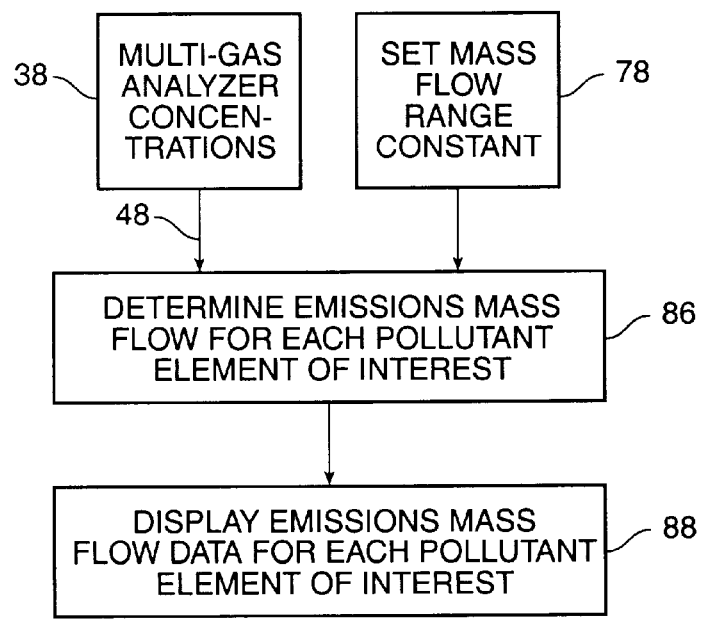

Turning now to FIG. 5, the concentrations measured by MGA 38 and transmitted to computer 46 over line 48 are each multiplied by the mass flow range set by the operator at step 78. Thus the pollutant mass flow (Kg sec$^{-1}$)=pollutant concentration * mass flow range. This calculation is carried out in step 86 of FIG. 5 which is labelled: "determine emissions mass flow for each pollutant element of interest". Once this calculation has been performed, step 88 may be executed, if desired, and the emissions mass flow data for each pollutant of interest may then be displayed.

Figure 6:
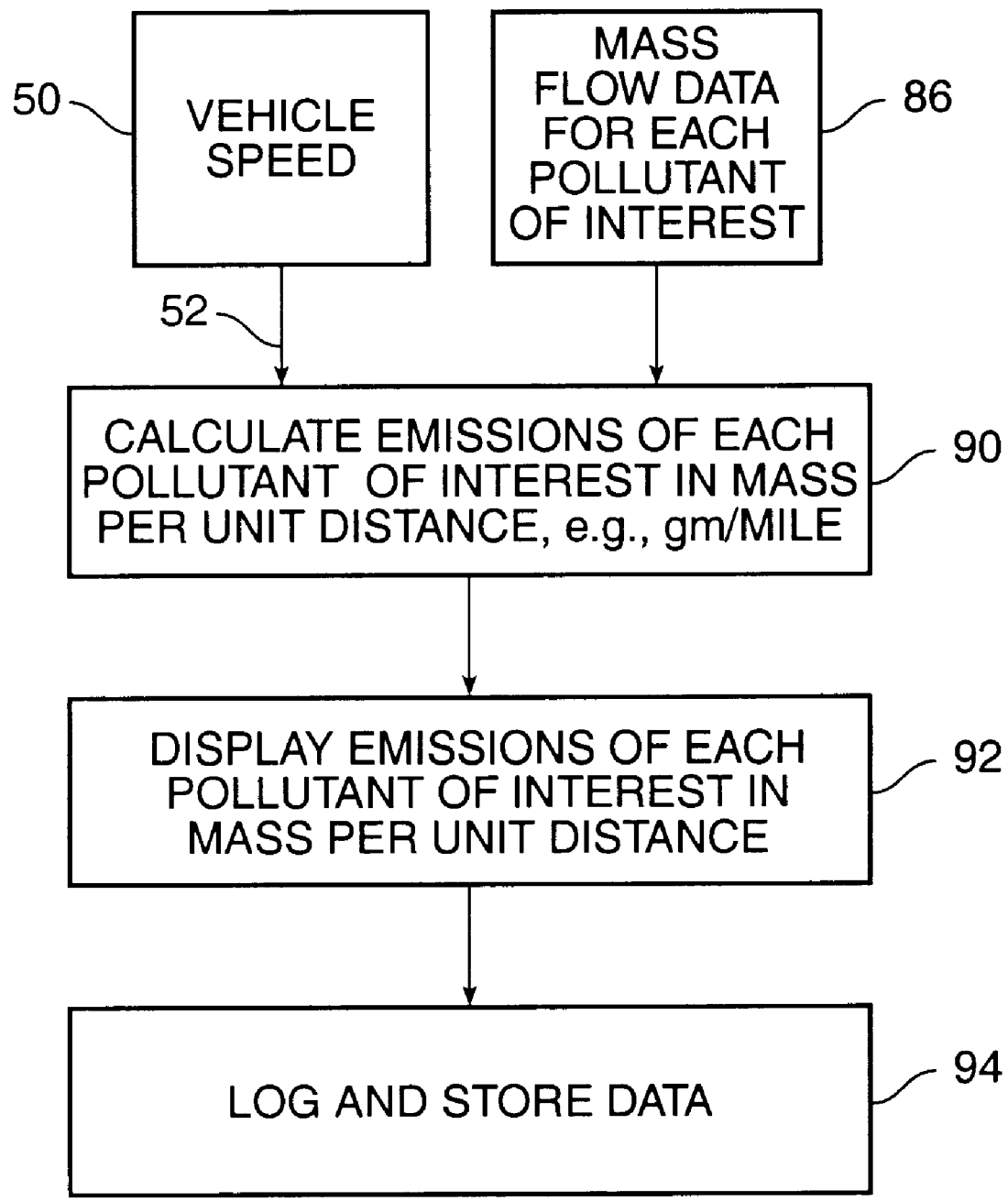

Turning now to FIG. 6, the vehicle speed, determined in a conventional manner with speed sensor 50 (FIG. 1) is integrated at step 90 with the mass flow information determined at step 86 to yield emissions in grams per mile (or some other mass per unit distance valve) which may be displayed in any suitable manner at step 92 and preferably recorded and/or logged at step 94 as known by those of ordinary skill in the art.

It is important to note that the sampling rate of the exhaust mass flow, the PWM valve cycle frequency, and the transport delay between the exhaust sample port and the PWM valve must be established so that the dilution pattern faithfully follows variations in exhaust mass flow. When this fidelity is achieved, then the output of MGA 38, when scaled by the mass flow range and integrated over the time of the test will accurately represent the mass flow of the analyzed gases at the tailpipe even if the response time of MGA 38 is very long (typically up to about 10 sec in a presently preferred embodiment of the present invention).

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. An emissions gas analyzer for analyzing an exhaust flow of an engine, said analyzer comprising:
   a gas control valve having a first gas input, a second gas input and a gas output;
   means for diverting a portion of the exhaust flow to said first gas input of said gas control valve;
   means for providing a fresh air stream to said second gas input of said gas control valve;
   a constant volume pump operatively coupled to said gas output of said gas control valve;
   a multi-gas analyzer operatively coupled to said gas output of said gas control valve and to said constant volume pump; and
   modulating means for pulse width modulating said gas control valve between a first position and a second position, said first position permitting gas from said first gas input to flow out of said gas output of said control valve and said second position permitting gas from said second gas input to flow out of said gas output of said control valve.

2. An emissions gas analyzer according to claim 1, further comprising a computer, wherein said modulating means is responsive to said computer and said computer is adapted to modulate said gas control valve so that the mass percentage of exhaust gases passing out of said gas output of said gas control valve is proportional to the total mass flow of exhaust gases in the exhaust.

3. An emissions gas analyzer according to claim 1, further comprising means for equalizing gas temperatures of said portion of the exhaust flow and said fresh air stream prior to their respective application to said first gas input and said second gas input of said gas control valve.

4. An emissions gas analyzer according to claim 2, further comprising means for equalizing gas temperatures of said portion of the exhaust flow and said fresh air stream prior to their respective application to said first gas input and said second gas input of said gas control valve.

5. An emissions gas analyzer, comprising:
   an exhaust gas tube to supply exhaust gases from an exhaust of an internal combustion engine;
   an ambient air tube to supply fresh air;
   a constant volume pump;
   a gas control valve responsive to a control signal having a first gas input, a second gas input and a gas output, said first gas input coupled to said exhaust gas tube; said second gas input coupled to said ambient air tube; said gas output operatively coupled to said constant volume pump;
   a gas analyzer operatively coupled to said constant volume pump and to said gas output so that a constant volume per unit time of gas is supplied to said gas analyzer from said output; and
   a controller for generating said control signal for application to said gas control valve so as to cause a concentration of said exhaust gases at said gas output to be proportional to an exhaust mass flow of said exhaust.

6. An emissions gas analyzer according to claim 5, further comprising a gas temperature equalizer for equalizing gas temperatures of said exhaust gases applied to said first gas input and a portion of said fresh air applied to said second gas input.

7. An emissions gas concentration analyzer comprising:
   a tail pipe extension element adapted to be inserted into the exhaust gas flow of an internal combustion engine;
   an exhaust gas tube, connected to said tail pipe extension element, for extracting a portion of said exhaust gas flow;
   an ambient air tube for supplying fresh air;
   a gas control valve responsive to a control signal and having a first gas input connected to said exhaust gas tube, a second gas input connected to said ambient air tube, a gas output;
   a constant volume pump operatively connected to said gas output; and
   a controller for generating said control signal, said controller programmed to adjust an operational duty cycle of said gas control valve with said control signal so that the ratio of exhaust gas to total volume delivered to said constant volume pump through said gas output is equal to the ratio of exhaust mass flow to mass flow range where mass flow range is a constant set at the beginning of a measurement and is larger than the greatest exhaust mass flow value measured during said measurement.

8. An apparatus according to claim 1 including means for displaying at least one individual gas mass flow value for a constituent gas of the exhaust.

9. An apparatus according to claim 2 including means for displaying at least one individual gas mass flow value for a constituent gas of the exhaust.

10. An apparatus according to claim 3 including means for displaying at least one individual gas mass flow value for a constituent gas of the exhaust.

11. An apparatus according to claim 4 including means for displaying at least one individual gas mass flow value for a constituent gas of the exhaust.

12. An apparatus according to claim 5 including means for displaying at least one individual gas mass flow value for a constituent gas of the exhaust.

13. An apparatus according to claim 6 including means for displaying at least one individual gas mass flow value for a constituent gas of the exhaust.

14. An apparatus according to claim 7 including means for displaying at least one individual gas mass flow value for a constituent gas of the exhaust.

15. An apparatus according to claim 8 including a means for integrating over a period of time, said at least one individual gas mass flow value for a constituent gas of the exhaust to provide a mass per unit time measurement of said at least one individual gas flow.

16. An apparatus according to claim 9 including a means for integrating over a period of time, said at least one individual gas mass flow value for a constituent gas of the exhaust to provide a mass per unit time measurement of said at least one individual gas flow.

17. An apparatus according to claim 10 including a means for integrating over a period of time, said at least one individual gas mass flow value for a constituent gas of the exhaust to provide a mass per unit time measurement of said at least one individual gas flow.

18. An apparatus according to claim 11 including a means for integrating over a period of time, said at least one individual gas mass flow value for a constituent gas of the exhaust to provide a mass per unit time measurement of said at least one individual gas flow.

19. An apparatus according to claim 12 including a means for integrating over a period of time, said at least one individual gas mass flow value for a constituent gas of the exhaust to provide a mass per unit time measurement of said at least one individual gas flow.

20. An apparatus according to claim 13 including a means for integrating over a period of time, said at least one individual gas mass flow value for a constituent gas of the exhaust to provide a mass per unit time measurement of said at least one individual gas flow.

21. An apparatus according to claim 14 including a means for integrating over a period of time, said at least one individual gas mass flow value for a constituent gas of the exhaust to provide a mass per unit time measurement of said at least one individual gas flow.

22. An apparatus according to claim 15 further comprising a means for measuring speed of a vehicle to which the apparatus is connected and a means for determining a mass per unit distance measurement of said at least one individual gas flow.

23. An apparatus according to claim 16 further comprising a means for measuring speed of a vehicle to which the apparatus is connected and a means for determining a mass per unit distance measurement of said at least one individual gas flow.

24. An apparatus according to claim 17 further comprising a means for measuring speed of a vehicle to which the apparatus is connected and a means for determining a mass per unit distance measurement of said at least one individual gas flow.

25. An apparatus according to claim 18 further comprising a means for measuring speed of a vehicle to which the apparatus is connected and a means for determining a mass per unit distance measurement of said at least one individual gas flow.

26. An apparatus according to claim 19 further comprising a means for measuring speed of a vehicle to which the apparatus is connected and a means for determining a mass per unit distance measurement of said at least one individual gas flow.

27. An apparatus according to claim 20 further comprising a means for measuring speed of a vehicle to which the apparatus is connected and a means for determining a mass per unit distance measurement of said at least one individual gas flow.

28. An apparatus according to claim 21 further comprising a means for measuring speed of a vehicle to which the apparatus is connected and a means for determining a mass per unit distance measurement of said at least one individual gas flow.

29. A method for conducting a measurement of a quantity of at least one individual gas in an exhaust of an internal combustion engine, said exhaust containing a plurality of exhaust gases, said method comprising the steps of:

setting a mass flow range constant value to a value larger than the greatest exhaust mass flow value expected during the measurement;

directing a portion of the exhaust gases to a first gas input of a gas control valve;

applying fresh air to a second gas input of said gas control valve;

equalizing temperatures of said fresh air applied to said second gas input and said portion of the exhaust gases applied to said first gas input;

pumping a constant volume of air from said first input or said second input through an output of said gas control valve; and controlling said gas control valve so as to adjust an operational duty cycle of said gas control valve value so that a ratio of said portion of the exhaust gases passing through said first gas input to a total volume exiting said output is equal to a ratio of exhaust mass flow to said mass flow range constant value.

30. A method according to claim 29, further comprising the steps of:

applying gases from said output of said gas control valve to a gas concentration analyzer.

31. A method according to claim 30, further comprising the steps of:

measuring a speed of a vehicle in which the internal combustion engine is located.

32. A method according to claim 31, further comprising the step of:

determining at least one individual gas mass flow value for a constituent gas of the plurality of exhaust gases.

33. A method according to claim 32, further comprising the step of:

determining, for at least one constituent gas of the plurality of exhaust gases, a mass per unit distance of emissions of said constituent gas.

\* \* \* \* \*